(12) United States Patent
Pepke et al.

(10) Patent No.: US 12,693,964 B2
(45) Date of Patent: Jul. 28, 2026

(54) METHOD FOR OPERATING A VEHICLE CONTROLLER

(71) Applicant: Robert Bosch GmbH, Stuttgart (DE)

(72) Inventors: Jan Pepke, Remseck A.N. (DE);
Dimitrios Stavrianos, Stuttgart (DE);
Sebastian Kirsch, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 350 days.

(21) Appl. No.: 18/685,832

(22) PCT Filed: Aug. 5, 2022

(86) PCT No.: PCT/EP2022/072127
§ 371 (c)(1),
(2) Date: Mar. 29, 2024

(87) PCT Pub. No.: WO2023/025572
PCT Pub. Date: Mar. 2, 2023

(65) Prior Publication Data
US 2024/0370354 A1 Nov. 7, 2024

(30) Foreign Application Priority Data
Aug. 26, 2021 (DE) ..................... 10 2021 209 362.0

(51) Int. Cl.
*G06F 11/3698* (2025.01)
*G06F 21/53* (2013.01)

(52) U.S. Cl.
CPC .......... *G06F 11/3698* (2025.01); *G06F 21/53* (2013.01)

(58) Field of Classification Search
None
See application file for complete search history.

(56) References Cited

U.S. PATENT DOCUMENTS

| | | | |
|---|---|---|---|
| 2007/0226773 A1* | 9/2007 | Pouliot | G06F 21/53 726/1 |
| 2016/0085602 A1* | 3/2016 | Jacobson | G06F 21/629 726/30 |
| 2018/0189103 A1* | 7/2018 | Teshler | G06F 9/5027 |

(Continued)

FOREIGN PATENT DOCUMENTS

WO 2021209175 A1 10/2021

OTHER PUBLICATIONS

Goh et al., "Schedulable Online Testing Framework for Real-Time Embedded Applications in VM," Springer, 2007. (Year: 2007).*

(Continued)

*Primary Examiner* — Ryan D. Coyer
(74) *Attorney, Agent, or Firm* — NORTON ROSE FULBRIGHT US LLP

(57) ABSTRACT

A method for operating a vehicle controller. A regular application for normal operation of the vehicle controller is executed on a first partition. A sandbox is provided on a second partition. In the sandbox, an application to be tested is executed. The sandbox is provided such that read access to the regular application is possible therefrom. Signals and/data used in the regular application during normal operation are obtained and processed by the application to be tested. A corresponding vehicle controller is also provided.

11 Claims, 1 Drawing Sheet

(56)  References Cited

U.S. PATENT DOCUMENTS

2019/0146450 A1*   5/2019   Sehestedt ............. G05B 19/056
                                                              700/79
2020/0125721 A1*   4/2020   Antony .............. H04L 63/0209

OTHER PUBLICATIONS

Maass et al., "A systematic analysis of the science of sandboxing,"
PeerJ, 2016. (Year: 2016).*
Masek et al., "Systematic Evaluation of Sandboxed Software Deploy-
ment for Real-time Software on the Example of a Self-Driving
Heavy Vehicle," arXiv, 2016. (Year: 2016).*
Goh et al. "Schedulable Online Testing Framework for Real-Time
Embedded Applications in VM," SAT 2015 18th International
Conference (2007); pp. 730-741.
International Search Report for PCT/EP2022/072127, Issued Nov.
22, 2022.

* cited by examiner

METHOD FOR OPERATING A VEHICLE CONTROLLER

FIELD

The present invention relates to a method for operating a vehicle controller and to a vehicle controller and a computer program for carrying out said method.

BACKGROUND INFORMATION

Modern vehicles have more and more functionalities which are provided by software on controllers, in particular also so-called central vehicle computers (which are particularly powerful computing systems which can cover a plurality of different functionalities).

SUMMARY

According to the present invention, a method for operating a vehicle controller as well as a vehicle controller and a computer program for carrying out the method are provided. Advantageous example embodiments of the present invention are disclosed herein.

The present invention is concerned with operating a vehicle controller or with such a vehicle controller. In this respect, so-called embedded controllers or systems are also often mentioned because they are provided or configured for certain tasks in a superordinate system, for example, or a technical context such as a vehicle. In this case, the computer, i.e., the controller, for example assumes monitoring, control or regulating functions and/or is responsible for a form of data or signal processing. In this context, reference is to be made in general to a vehicle controller below. However, this term is to be understood to mean not only simple controllers for only individual or few functions but also so-called central vehicle computers which carry out a multitude of functions, in particular also computationally intensive functions.

In modern vehicles, as mentioned, the number of functionalities that are executed by software on a controller or, in general, on controllers continues to increase. In particular, the complexity of the software thus increases exponentially in such software-driven systems in the automotive field. At the same time, however, it generally becomes more difficult to verify functional components of the software on the basis of real conditions, since the final E/E architecture of the vehicles is often not (yet) available at the time of the verification. Furthermore, development vehicles themselves are not always equipped with all necessary subsystems (which would be necessary for necessary tests), and the further development of transverse-dependent subsystems often takes place in parallel with one another. Assumptions about the behavior of the software or of the controller are also often made at the beginning of the series, which assumptions are later found to be not optimal or not at all applicable. Changes in particular in the embedded systems mentioned require complex regression tests.

Simulative approaches (e.g., via special software or test software, or also HIL, so-called hardware in the loop) can address some of the mentioned points but cannot completely cover them. The present invention, on the other hand, makes it possible to pair continuous learning from the field (i.e., the controllers in use in serial operation) with a flexible solution of verifying and continuously improving new functions of an application or software both in the development phase and in serial operation, without actively intervening in the actual state of the system.

In order to achieve this, according to an example embodiment of the present invention, during operation of the vehicle controller, a regular application (or software) for normal operation of the vehicle controller is executed on a first partition (a partition is in particular understood to mean a part of a suitable physical or logical volatile or non-volatile memory). This at least one regular application should in particular comprise the functions customary for a vehicle controller, such as brake control functions in an ESP controller. However, other applications or functions, such as engine control functions or driver assistance functions, such as distance and/or speed control, are also possible. Possible in particular are also functions or algorithms that are based on artificial intelligence or machine learning methods, possibly also using artificial neural networks. In general, said functions or algorithms can be functions that have already been customary.

In addition, a sandbox, i.e., an isolated environment within which each action has no effect on the rest of the vehicle controller and the external environment, is now provided on a second partition of the vehicle controller, in which sandbox an application to be tested is executed. The application to be tested may, for example, be an updated version of a regular application or a portion thereof but also new or modified functions for the vehicle controller.

When testing software or applications, it should be ensured that the system on which the tests are run, here the vehicle controller, is not changed, disturbed or damaged in any form by this application to be tested. A so-called sandbox now allows certain special features in, for example, the runtime environment of a software or the local work copy of a software module stored in a version control system. The application or software to be tested is shielded from the rest of the system, the regular application for normal operation, put into the sandbox so to speak (therefore the common term "sandbox"), in which sandbox the application or software cannot cause any damage and, if need be, the effects of the software can be recorded.

In this sense, the second partition on the vehicle controller is also correspondingly separated from the first partition, whereby the sandbox is provided. On the one hand, such a separation can, for example, take place via the assignment of the physical or logical memory to the respective partition. On the other hand, it can, for example, take place by read-only access (access only for reading) for the shadow mode partition, i.e., the partition on which the sandbox runs. In other words, in a conventional vehicle controller, an additional partition can be added as this second partition, on which the sandbox is then provided. While the first partition generally has a high safety level, such as ASIL-D or even any ASIL level (ASIL stands for Automotive Integrity Safety Level), the second partition can be operated at a lower safety level, e.g., a lower ASIL level or simply only the so-called QM level.

The sandbox (on the second partition) is provided such that read access to the application for normal operation is possible therefrom so that signals and/or data used by the regular application during normal operation can also be obtained and processed by the application to be tested. For this purpose, the regular application can first be configured so that it transmits, for example, the necessary signals and/or data (also) to the sandbox or the application to be tested or allows the reading thereof. The application to be tested can thus use all necessary and customary signals, which the regular application also uses or has to use, or at least those that are necessary for the test. These signals in turn can be obtained from the vehicle controller or the regular application from outside, e.g., from another controller or a sensor. This can, however, also be understood to mean signals or other data produced during the execution of the regular application.

In particular, the sandbox is operated such that no write access to the regular application (or the first partition) is possible therefrom. This prevents undesirable interventions in the normal operation so that problems or errors in the application to be tested or in the sandbox do not lead to any restriction of the actual functions of the vehicle controller.

In particular, making these approaches possible for embedded controllers or, in general, vehicle controllers has decisive advantages. For example, development cycles for software or applications for such vehicle controllers are shorter due to the possibility of testing at the user (i.e., for example, during normal operation in the field). The software can be continuously developed in the field, and data-based algorithms can be iteratively developed and released in short steps. If an error occurs due to a poorly developed software (e.g., divisor of 0), the (entire) controller does not have to be switched to emergency operation or switched off; only the application to be tested in the sandbox is affected. The vehicle can continue to be operated with its primary software. In combination with OTA Updates (OTA stands for over-the-air), the sandboxes can be updated quickly.

Today's widely used solutions in the area of the vehicle controllers or embedded controllers are rather monolithic, i.e., the change in a dedicated function results in a new overall application or overall software, which is verified and rolled out. In contrast, the proposed procedure according to the present invention provides the possibility of breaking through the monolithic approach in that changed and/or new functions can be rolled out and verified (through the use of the sandbox) in parallel with running software. The verification of the changed functions is supported with data collected in the field, and the collection of the field data in turn can also run as a sandbox and a flexible overall construct can thus be created.

As a result of the sandbox in a vehicle controller, the application to be tested and any problems occurring therein have no influence in terms of functional safety. Interfaces of the software components that run in the (or as a) sandbox are in particular designed such that they make operation as a sandbox possible, i.e., for example, that no write accesses from the sandbox (second partition) into the rest of the software (regular application, first partition) take place. The sandbox components do not intervene in the active execution, in particular control of the actuator system, or in the functional calculation rules. Errors in the sandbox or the application to be tested in particular lead to deactivation of the sandbox but not of the primary software, i.e., the regular application. The sandbox can in particular also be exchanged independently of the rest of the software (i.e., the regular application on the first partition). The sandbox can expediently also be activated and deactivated from the outside.

In particular in serial operation, the sandbox can access the internal signals or data of the controller, process them, and transfer produced data and/or signals and/or parameters indirectly or directly for analysis, etc. to a further computing unit. The further computing unit can in particular be an off-board computing system, for example in a data processing center. For this purpose, the produced data can be transferred wirelessly, for example. The transfer can in particular take place via the regular application, which is typically already integrated into an onboard power supply system with further controllers, for example also one for wireless communication. In the regular application, preprocessing can then also take place so that the data are, for example, converted into a suitable format for transferring them. This makes further analysis of the signals possible, for example in a so-called backend system or other off-board computing system, while at the same time reducing the data stream necessary for this purpose. The data, signals, and parameters obtained can then be analyzed on the computing unit; for example, the functionality can be checked for anomalies. Furthermore, the parameters can be optimized and optimized parameters can again be transferred to the sandbox for further use. Iterative improvement can take place in this way. In this case, the application to be tested thus obtains updated or optimized data for further tests from the computing unit. It is also possible for an updated application to be tested to be obtained (which then replaces the present application). In principle, this is also possible without optimizing the data previously transferred to the computing unit; for example, new data obtained in other ways can be transferred to the sandbox. A further sandbox can also participate in this transfer. In particular, it can be provided that data and/or signals and/or parameters (P) produced within the scope of the execution of the application to be tested are transferred into a further sandbox, from which write access to the regular application is possible.

According to an example embodiment of the present invention, trigger conditions can preferably also be configured. Triggers or trigger conditions are to be understood, for example, as signal-based triggers that serve or make it possible to preprocess the data generated in the sandbox. This reduces the transfer rate, for example to the cloud. These triggers can also be used to activate the sandbox, i.e., to carry out the calculation in the sandbox. Through this trigger-based activation, the utilization of the controller can take place in a need-based manner.

A vehicle controller according to the present invention is configured, in particular with respect to programming, to carry out a method according to the present invention.

Furthermore, the implementation of a method according to the present invention in the form of a computer program or computer program product having program code for carrying out all the method steps of the present invention is advantageous because it is particularly low-cost, in particular if an executing control unit is also used for further tasks and is therefore present anyway. Suitable data carriers for providing the computer program are, in particular, magnetic, optical, and electric storage media, such as hard disks, flash memory, EEPROMs, DVDs, and others. It is also possible to download a program via computer networks (Internet, intranet, etc.).

Further advantages and embodiments of the present invention can be found in the description and the figures.

The present invention is illustrated schematically in the figures on the basis of an embodiment and is described below with reference to the figures.

DETAILED DESCRIPTION OF EXAMPLE
EMBODIMENTS

Figure 1:
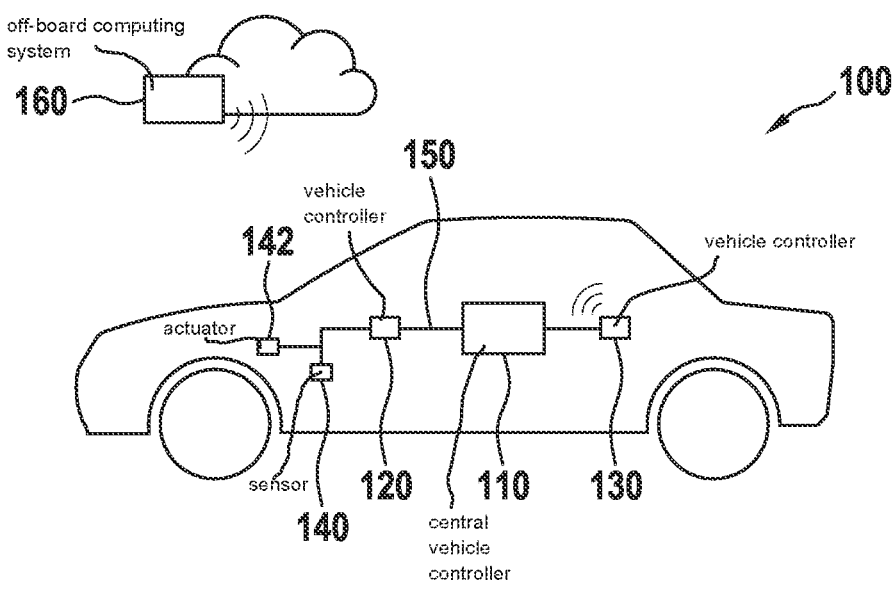
FIG. 1 schematically shows a vehicle with vehicle controllers for explaining a method according to the present invention in a preferred embodiment.

FIG. 1 schematically shows a vehicle 100 with vehicle controllers 110, 120, 130 for explaining a method according to the present invention in a preferred embodiment. By way of example, the vehicle controller 110 is a so-called central vehicle computer, and the vehicle controllers 120, 130 are simple or regular controllers. The three vehicle controllers 110, 120 and 130 are connected to one another in a data-transferring manner by means of a communication medium 150, such as a CAN bus.

By way of example, a sensor 140 and an actuator 142 are connected to the vehicle controller 120, and the vehicle controller 130 is configured for wireless communication. Furthermore, an off-board computing system 160, e.g., a backend, also within the framework of a so-called cloud, is shown as a computing unit, which is also (typically indirectly) configured for wireless communication and, for example, can wirelessly exchange data with the vehicle controller 130. This can, for example, take place via mobile radio. Via the vehicle controller 130, the further vehicle controllers 110, 120 can also (indirectly) exchange data wirelessly with the off-board computing system 160.

Figure 2:
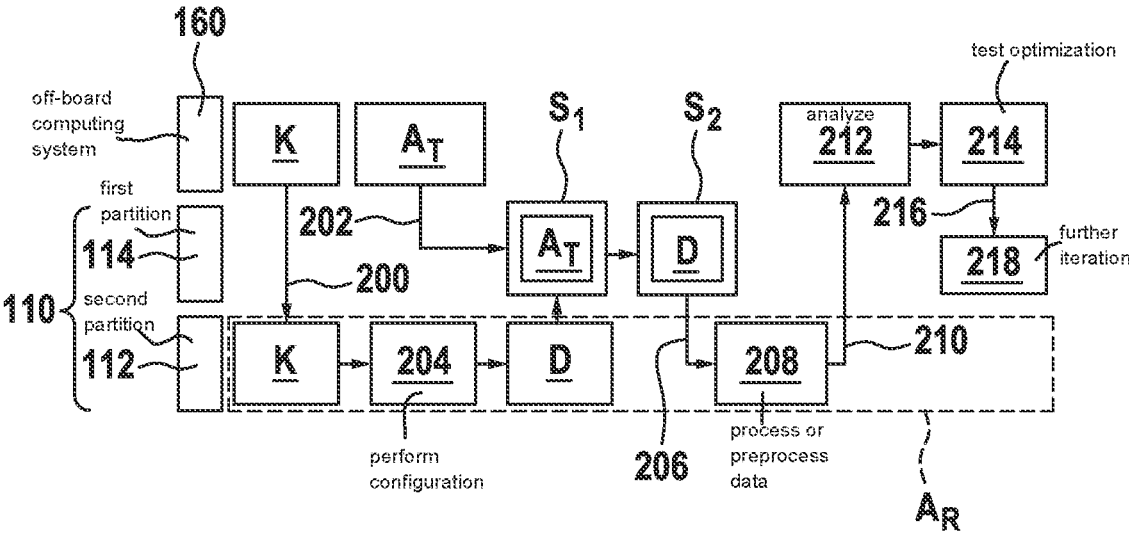
FIG. 2 schematically shows a structure of a vehicle controller for further explaining a method according to the present invention in a preferred embodiment.

FIG. 2 schematically shows a structure of the vehicle controller 110 for further explaining a method according to the present invention in a preferred embodiment in more detail. It is understood that the vehicle controller 110 is selected here only by way of example; one of the other vehicle controllers shown or all of them can also be designed accordingly. Also shown is the off-board computing system 160.

The vehicle controller 110 has two partitions. A first partition 112, for example, represents a partition with a certain safety level, on which partition a regular application (software) for normal operation of the vehicle controller is also executed.

A second partition 114 has a lower (or no) safety level and serves to provide one or more sandboxes, as explained below. The partitions 112, 114 can in particular be software levels in the vehicle controller, which are stored in different regions of the volatile or non-volatile memory. From a sandbox provided on the second partition 114 for an application to be tested, only read access, but not write access, to the first partition 112 or the regular application is in particular possible.

The sandbox is in particular a protected region in microcontroller-based ($\mu$C) and microprocessor-based ($\mu$P) controllers (ECUs), in which region it is possible to operate software, features, algorithms, and services passively, i.e., in parallel with the functional software (homologated operating software), without having any effect on said functional software. This in particular requires the functional software to be free from interference by the sandbox. On the one hand, this is achieved by partitioning: parts of the volatile and/or non-volatile memory are fixedly assigned to the functional partition (homologated operating software) and to the sandbox partition. This separation has the result that, during its operation, the homologated software is not impaired by the sandbox. That is to say, the sandbox can also be changed, e.g., replaced (flashed), partially and independently of the homologated software.

On the other hand, this can be achieved by restricted permissions of the sandbox partition: The sandbox partition is restricted in its range of functions in order not to influence the homologated software. This takes place, for example, by the sandbox partition only having or obtaining read permissions and no write permission.

The sequence for operating the vehicle controller 110, in particular the test of an application or software to be tested, is now explained in more detail below.

On the off-board computing system 160, a developer can, for example, provide the application $A_T$ to be tested and a configuration K (which can be configuration data) after the application $A_T$ to be tested has first been developed, for example. In a step 200, the configuration K is then transferred to the vehicle controller 110 and the first partition 112 there, or the regular application $A_R$ executed there.

At the same time or beforehand or afterwards, in a step 202, the application $A_T$ to be tested is transferred to the vehicle controller 110 and the second partition 114 there, or the sandbox $S_1$ provided there. The transfer in both steps 200, 202 can, for example, take place wirelessly as explained with reference to FIG. 1. It is possible that this takes place within the framework of an OTA update or also of other validation tests.

In the regular application $A_R$, a configuration is performed on the basis of the configuration or the configuration data K in a step 204. The regular application $A_R$ is thereby, for example, configured to provide certain signals and/or data D, which said regular application uses during operation (and obtains from sensors and processes, etc. for this purpose), for the application $A_T$ to be tested so that said application to be tested can read them. During operation, the application to be tested then reads the necessary signals or data D.

In this way, real operation with the application to be tested is thus simulated directly on the vehicle controller 110, without any errors or problems in the application to be tested or consequences thereof having any effect on the regular application $A_R$ and thus the normal operation of the vehicle controller. Write access of the application $A_T$ to be tested or from the sandbox $S_1$ to the regular application or the first partition 112 is not possible.

During operation, in particular on the basis of the signals obtained, the regular application $A_R$ outputs data and/or signals and/or parameters, by means of which actuators are controlled or information is transmitted or displayed, for example. The application $A_T$ to be tested also generates data and/or signals and/or parameters, here denoted by P as a whole. Said data and/or signals and/or parameters are now transferred to a further sandbox $S_2$, which is also provided on the second partition 114. These data and/or signals and/or parameters P are then transferred from there to the regular application $A_R$ in step 206. For this purpose, write access from the further sandbox $S_2$ to the regular application $A_R$ or the first partition 112 is necessary; however, through separation from the first sandbox $S_1$, access by the application to be tested itself is ruled out. This achieves that the data, generated by the (first) sandbox $S_1$, and the like can nevertheless be detected and processed further. In particular, the sandbox S2 can "simulate" a data sink, e.g., a controller to which the application to be tested usually outputs its results, for the sandbox S1.

In step 208, said data are then processed or preprocessed. By preprocessing the data generated in the sandbox, the relevant information is generated with high-resolution data. The preprocessing increases the information content of the sandbox data volume to be transferred. This results in an improved data transfer rate into the cloud. This is implemented, for example, by (configurable) triggers as already mentioned. These triggers can also be used to activate the sandbox, i.e., to carry out the calculation in the sandbox.

Through trigger-based activation, utilization of the controller can take place in a need-based manner.

Subsequently, the data and/or signals and/or parameters P are then transferred, e.g., wirelessly again, from the regular application $A_R$ to the off-board computing system 160 in step 210. There, in step 212, these data and/or signals and/or parameters P are then analyzed with respect to the functionality of the application to be tested, e.g., with regard to the detection of anomalies or errors.

In a step 214, optimization of the application to be tested can then take place, which optimization is then in step 216, in the same way as in step 202, transferred to the vehicle controller 110 and the second partition 114 there, or the sandbox $S_1$ provided there. If necessary, a new configuration can also be transferred as in step 200. In a further iteration 218, the described procedure can then run again, in particular also with further iterations. The present invention thus, in particular, makes it possible to test new software directly in the field, i.e., on a very high number of controllers (typically several millions), without, however, impairing normal operation in the field. If the application to be tested is considered to be finished, it can also replace the regular application or a part thereof within the framework of an update or can be used additionally, then in particular also on the first partition.

The invention claimed is:

1. A method for operating a vehicle controller, the method comprising:

executing, on a first partition, a regular application for normal operation of the vehicle controller;

providing a sandbox on a second partition, and executing, in the sandbox an application to be tested;

wherein the sandbox is provided such that read access to the regular application is possible from the sandbox, wherein signals and/or data used by the regular application in the normal operation are obtained and processed by the application to be tested;

wherein data and/or signals and/or parameters produced within a scope of the execution of the application to be tested are transferred into a further sandbox, from which write access to the regular application is possible; and wherein the data and/or signals and/or parameters are transferred from the further sandbox to the regular application.

2. The method according to claim 1, wherein the sandbox is operated such that no write access to the regular application is possible from the sandbox.

3. The method according to claim 1, wherein the data and/or signals and/or parameters produced within the scope of the execution of the application to be tested are transferred to a further computing unit.

4. The method according to claim 1, wherein the data and/or signals and/or parameters are transferred from the further sandbox to a further computing unit.

5. The method according to claim 4, wherein the data and/or signals and/or parameters are transferred from the regular application to the further computing unit for analysis.

6. The method according to claim 1, wherein the application to be tested obtains updated or optimized data for further tests from a computing unit, and/or wherein an updated or optimized application to be tested is obtained from the computing unit.

7. The method according to claim 1, wherein the regular application is configured for providing data to the sandbox before a start of the test of the application to be tested.

8. The method according to claim 1, wherein, in the event of an error in the application to be tested, the sandbox is deactivated and the regular application continues to be operated.

9. The method according to claim 1, wherein the first partition is provided at a higher safety level than the second partition.

10. A vehicle controller configured to operate a vehicle controller, the vehicle controller configured to:

execute, on a first partition, a regular application for normal operation of the vehicle controller;

provide a sandbox on a second partition, and executing, in the sandbox an application to be tested;

wherein the sandbox is provided such that read access to the regular application is possible from the sandbox, wherein signals and/or data used by the regular application in the normal operation are obtained and processed by the application to be tested;

wherein data and/or signals and/or parameters produced within a scope of the execution of the application to be tested are transferred into a further sandbox, from which write access to the regular application is possible; and wherein the data and/or signals and/or parameters are transferred from the further sandbox to the regular application.

11. A non-transitory machine-readable storage medium on which is stored a computer program for operating a vehicle controller, the computer program, when executed on a vehicle controller, causing the vehicle controller to perform the following steps:

executing, on a first partition, a regular application for normal operation of the vehicle controller;

providing a sandbox on a second partition, and executing, in the sandbox an application to be tested;

wherein the sandbox is provided such that read access to the regular application is possible from the sandbox, wherein signals and/or data used by the regular application in the normal operation are obtained and processed by the application to be tested;

wherein data and/or signals and/or parameters produced within a scope of the execution of the application to be tested are transferred into a further sandbox, from which write access to the regular application is possible; and wherein the data and/or signals and/or parameters are transferred from the further sandbox to the regular application.

* * * * *